PRESSURIZED LIQUID COOLING SYSTEM

Original Filed March 24, 1969 3 Sheets-Sheet 1

INVENTOR.
WALTER C. AVREA
By Beehler & Arant
ATTORNEYS.

PRESSURIZED LIQUID COOLING SYSTEM

Original Filed March 24, 1969

INVENTOR
WALTER C. AVREA
By Beehler & Grant
ATTORNEYS.

PRESSURIZED LIQUID COOLING SYSTEM

Original Filed March 24, 1969 3 Sheets-Sheet 3

INVENTOR.
WALTER C. AVREA
BY Beehler & Grant
ATTORNEYS.

United States Patent Office

Re. 27,965
Reissued Apr. 9, 1974

27,965

PRESSURIZED LIQUID COOLING SYSTEM

Walter C. Avrea, Tempe, Ariz., assignor to Saf-Gard Products, Inc.

Original No. 3,499,481, dated Mar. 10, 1970, Ser. No. 813,800, Mar. 24, 1969, which is a continuation-in-part of application Ser. No. 683,223, Nov. 15, 1967. Application for reissue Feb. 22, 1972, Ser. No. 228,399
Int. Cl. F01p *11/18, 17/02;* F28d *15/00*
U.S. Cl. 165—11 18 Claims

Matter enclosed in heavy brackets [ ] appears in the original patent but forms no part of this reissue specification; matter printed in italics indicates the additions made by reissue.

ABSTRACT OF THE DISCLOSURE

A pressurized cooling system for a conventional internal combustion engine, wherein the cooling system includes an overflow passage communicating with the highest point in the radiator system in which there is an outflow check valve so that liquid expansion unseats the check valve and excess liquid passes through a passage to an accumulator tank; and when the radiator system cools and a low pressure suction condition is created, the liquid in the tank is drawn back through the same passage through the second check valve which opens inwardly toward the radiator to allow the liquid to be returned to the radiator.

This is a continuation-in-part of application Ser. No. 683,223, filed Nov. 15, 1967, now abandoned.

Recent cooling systems for combustion engines undertake to keep the radiator and the cooling liquid in it sealed under pressure, the pressure being determined by an overflow valve which sets the pressure at which the system operates. Since there is always the possibility of overheating, when the pressure sensitive valve releases due to the set pressure being exceeded, some radiator fluid is spilled on the ground and lost. Thereafter, when the engine cools, the radiator system is something less than full. Consequently, there being less than a desired amount of liquid in the radiator system, the next time the radiator overheats, there will be more air in the system than necessary; steam will be formed and again there will be an overflow of liquid which is spilled on the ground and lost making the water level still lower. Furthermore, the greater the air space in the radiator which continues to increase, the greater will be the amount of boiling and steaming of the liquid coolant, and this as a consequence passed through the engine block and the cooling becomes less effective and overheating more prevalent.

Further still, in systems of this kind when the liquid level gets low it becomes necessary to take off the radiator cap and refill. This is a persistent danger in the servicing of automobiles because of the ever-present tendency for the cap to pop off or blow off on account of the accumulation of steam when it is removed by the attendant, causing the attendant to be burned and sometimes burned badly. This continues to happen even though as a routine attendants are cautioned to always spread a waste cloth over the radiator cap when it is being removed from an overhead engine.

Where liquid cooling systems contain a liquid coolant other than water, every time there is some liquid lost by overflow resulting from overheating, expensive coolant is lost. When it is not convenient to replace the lost coolant with coolant of the same kind, water may be added to bring the level up and this dilutes the coolant causing it to perform unsatisfactorily.

It is therefore among the objects of the invention to provide a new and improved heat radiator and cooling device for a combustion engine which always operates under a specific desirable pressure and from which coolant liquid is never irretrievably lost.

Still another object of the invention is to provide a new and improved heat radiator and cooling device for a combustion engine which makes certain that overflow due to overheating is captured only at the highest point in the radiator tank and then collected in a [sealed] *vented* accumulator, from which it is returned to the radiator tank without any portion of it being lost as soon as the temperature of the radiator tank returns to normal.

Still another object of the invention is to provide a new and improved heat radiator and cooling device for a combustion engine wherein a simple check valve device is applied over an opening in the system through which coolant liquid may be supplied at the initiation of the operation, the valve device being of a unitary simple operating, inexpensive construction, and moreover one of such design that it can be mounted in place at the location where a conventional radiator cap is customarily applied.

With these and other objects in view, the invention consists in the construction, arrangement, and combination of the various parts of the device, whereby the objects contemplated are attained, as hereinafter set forth, pointed out in the appended claims and illustrated in the accompanying drawings.

Figure 1:
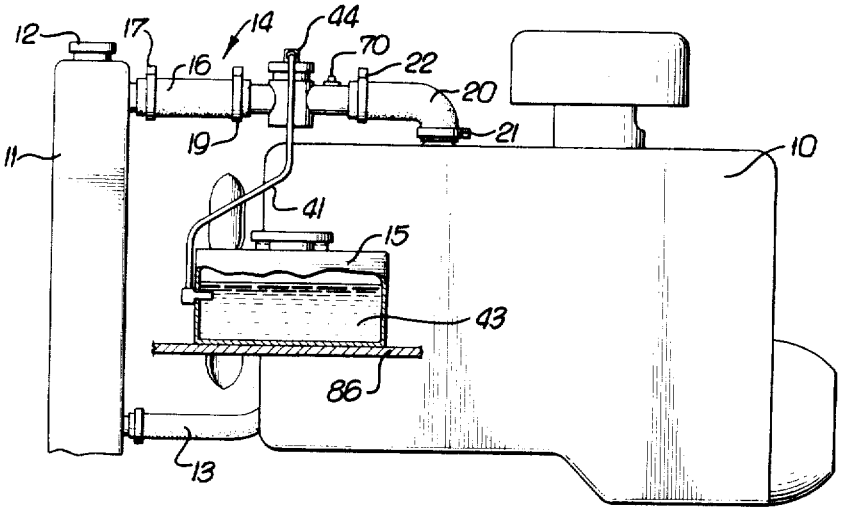
FIGURE 1 is a side elevatinoal view of a typical combustion engine and cooling system showing the invention located in a cooling water connection between the radiator reservoir and the engine, and showing an accumulator in longitudinal section.
Figure 2:
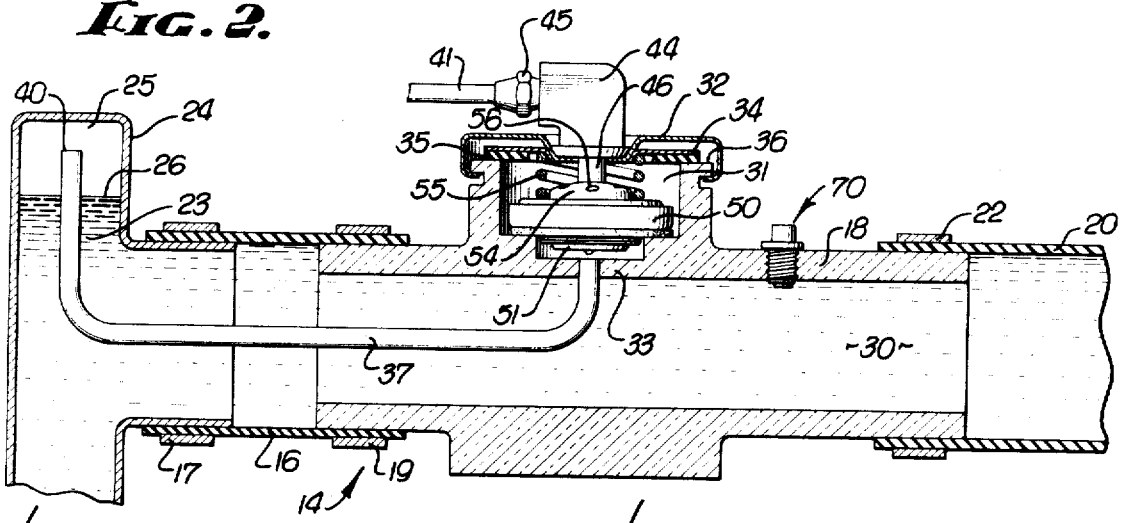
FIGURE 2 is a longitudinal sectional view through the cool water supply line showing the valve incorporating a portion of applicant's invention in section.
Figure 5:
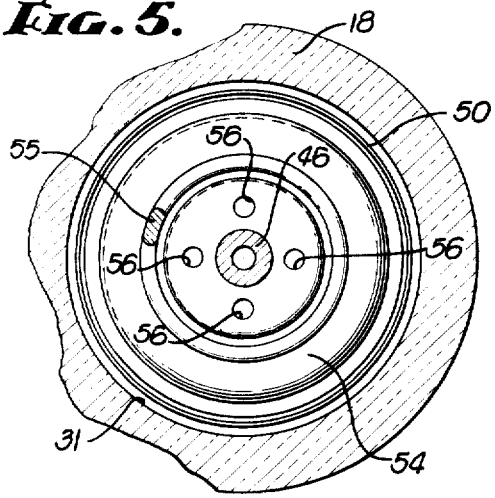
FIGURE 5 is a cross-sectional view on the line 5—5 of FIGURE 3.
Figure 6:
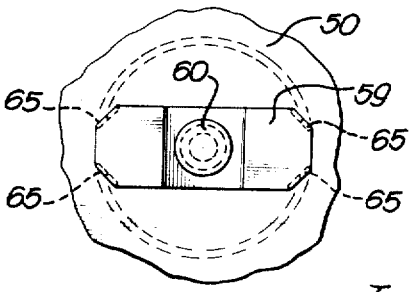
FIGURE 6 is a cross-sectional view on the line 6—6 of FIGURE 4.

In one embodiment of the invention, chosen for the purpose of illustration, there is shown a combustion engine 10 and a radiator 11 provided with a conventional fill cap 12, the radiator being connected to the combustion engine by means of a liquid supply line indicated generally by the reference character 13 and a liquid return line indicated by the reference character 14. An accumulator tank 15 is conveniently located on an appropriate bracket 86 near the engine 10.

In the chosen embodiment the return line 14 consists of a hose length 16 attached to the radiator 11 by means of a hose connection 17. A valve body 18 is attached to the same hose length 16 by means of a hose connection 19. A second hose length 20 is connected to the engine 10 by means of a hose connection 21, the same hose length 20 being connected to the valve body by means of a hose connection 22. It is significant that the valve body 18 is advantageously located at approximately the highest level for liquid coolant 23, which may be water or some other appropriate commercial coolant, which fills a reservoir 24 together with the balance of the cooling system. Inasmuch as the invention relates to pressure liquid coolant reservoirs, it will be understood that the fill cap 12 is a pressure sealed cap and that the entire system is a closed pressure system. Although the intent is to have the reservoir 24 filled to capacity, as a practical matter there will customarily remain a small air pocket 25 above a level 26 which is the top level of the coolant.

Figure 3:
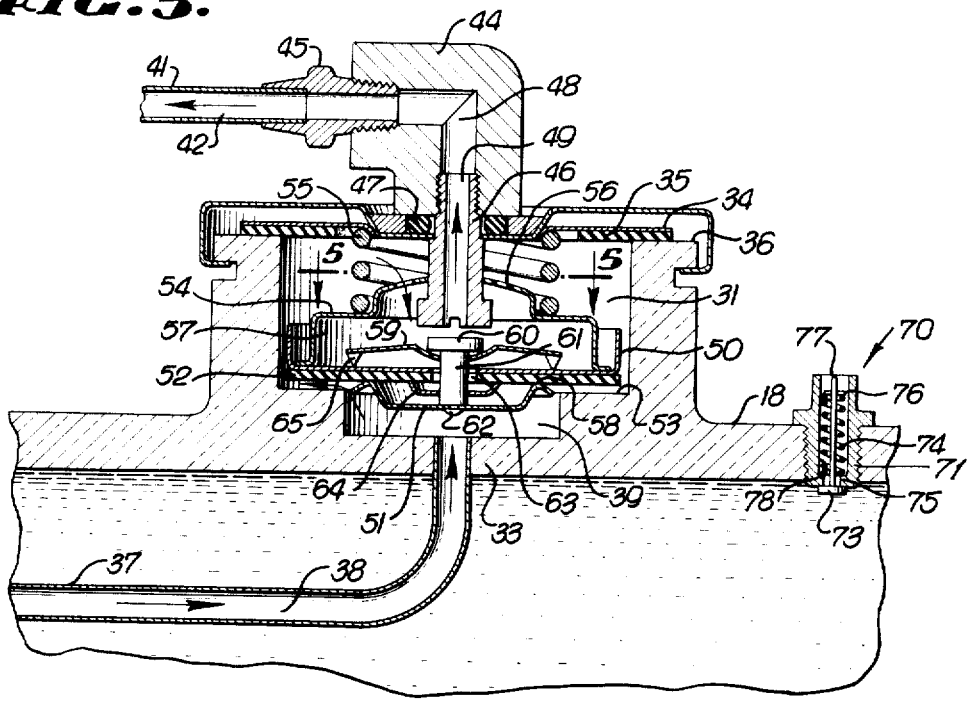
FIGURE 3 is a longitudinal sectional view of the valve itself in the position it would have when there is overheating.
Figure 4:
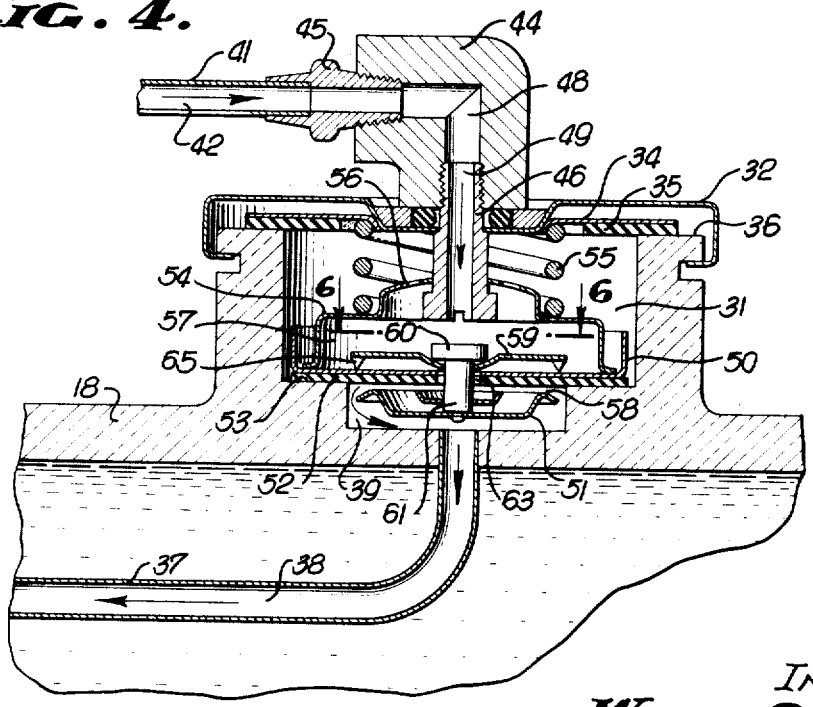
FIGURE 4 is a longitudinal sectional view similar to FIGURE 3 showing the position of the valve parts when the radiator is cool and cooling liquid is being fed back into the radiator.

Within the valve body 18 is a passage 30 and above the passage 30 is a valve chamber 31, the valve chamber being closed by a pressure cap 32 and having a bottom wall 33. For sealing the pressure cap 32 in position there is provided a valve element 34 on the underface of which is a washer 35 which is pressed upon a valve seat 36. These details and those of the check valve presently to be described are shown to specially good advantage in FIGURES 3 and 4.

An overflow line 37 connected at one end through the bottom wall 33 to a pocket 39 at the lower end of the chamber 31 has its opposite open end 40 communicating with the air pocket 25 just above the top level 26 of the coolant 23. The passage 38 accommodates overflow from the reservoir 24 when the engine overheats.

Interconnecting the valve body 18 and the accumulator tank 15 is a combined overflow and return line 41 which forms a passageway 42 between a chamber 43 in the accumulator tank 15 and the valve chamber 31. A fitting 44 in the form of an L is provided with a connection 45 to which the combined overflow and return line 41 is attached. The other end of the fitting 44 is pulled into sealed engagement with the top of the pressure cap 32 by employment of a sleeve 46 which is in threaded engagement with the fitting and draws the fitting tightly against an O-ring seal 47. To provide for communication between the passageway 42 and valve chamber 31, fluid passes through a bore 48 in the fitting 44 and an axially aligned bore 49 in the sleeve 46.

Within the chamber 31 are two check valves, namely a check valve 50 which opens in a direction enabling flow from the coolant reservoir 24 to the accumulator tank 15 and a check valve 51 which enables flow from the accumulator tank 15 to the coolant reservoir 24.

The check valve 50 has a washer 52 on its lower face which seats upon a valve seat 53. A dished pressure member 54 provides a keeper for a spring 55, the opposite end of the spring being contained by the valve element 34. Holes 56 through the pressure member 54 provide for the free flow of liquid coolant between the valve chamber 31 and a space 57 beneath the pressure member 54. The strength of the spring 55 determines the amount of pressure at which the reservoir 24 is held.

The check valve 51 has an annular valve seat 58 which seats upon the underside of the washer 52 at a location radially inwardly from the inner perimeter of the valve seat 53. A disc spring 59 acting upwardly against a head 60 of a pin 61 tends to hold the check valve 51 seated inasmuch as the lower end of the pin 61 is rivetted by means of a rivet 62 to the check valve 51. The pin 61 is centered within a port 63 which extends through the washer 52 and check valve 50 forming a communicating passage between the valve chamber 31 and the pocket 39, a spider 64 being of open construction and merely for guidance of the pin 61. Legs 65 hold the disc spring 59 clear of the adjacent face of the check valve 50 thereby to permit free flow of liquid coolant under the disc spring so that it can reach the port 63.

In operation with the parts in the positions shown in FIGURES 1, 2, 3, and 4, the radiator system is ready for operation. In this condition there may be some liquid coolant in the accumulator chamber 15, but of necessity there must be ample excess space within the chamber 43 of the accumulator tank to accommodate any future overflow from the reservoir 24 which may take place.

Should the engine overheat and the liquid coolant 23 tend to boil, the boiling overflow will pass into the open end 40 of the overflow line 37, and the pressure then generated in the system will be applied against the lower face of the washer 52 on the check valve 50 until it overcomes tension in the spring 55, at which point the check valve 50 will be lifted, and the hot liquid coolant will pass from the pocket 39 into the chamber 31 and thence through the holes 56 into the space 57 and from there through the bore 49, the passageway 42 and into the accumulator tank 15. When the pressure lowers, the spring 55 will seat the check valve 50, moving it from the position of FIGURE 3 to the position of FIGURE 4. Following this, and when the engine cools and the temperature of the liquid coolant 23 lowers to a point where there is a low pressure condition in the air pocket 25, liquid coolant will flow in a reverse direction. As it flows, pressure present in the accumulator tank being higher than the pressure present in the air pocket 25, pressure will be exerted by the liquid coolant on the upper side of the check valve 51 causing this pressure to overcome tension in the disc spring 59 which results in opening the check valve 51 to the position shown in FIGURE 4. Liquid coolant will then flow in the direction of the arrows from the space 57 through the bore 63 and thence around the check valve 51 into the pocket 39 and from there through the passageway 38 back into the reservoir 24.

Since the system is always closed, no liquid will have been lost even though some is expelled out of the reservoir due to overheating, inasmuch as when the engine cools it will always be returned from the accumulator tank to the reservoir. Accordingly, if a special cooling liquid is employed, it will never be lost and hence will never be diluted, and a proper pressure level for which the engine cooling system is designed will always be maintained.

Should a leak occur in the system and liquid coolant for that reason need replenishment, there is provided an inflow check filler valve 70 which may, for convenience, be located on the valve body 18. The filler valve consists of a valve housing 71 having a threaded engagement with the valve body 18. A valve element 73 is urged upwardly to closing position by a spring 74 bottomed on a shoulder 75 in the housing and pressing upwardly against a collar 76 on a valve stem 77. Pressure in the system will always urge the valve element toward closed position. To fill through the filler valve liquid coolant under pressure sufficient to overcome tension in the spring 74 and the pressure in the system is applied to force liquid coolant through a valve passage 78 to the system much as air under pressure fills a tire.

Although the valve body 18 is shown in the chosen embodiment as a means for mounting the check valve assembly, it will be understood that inasmuch as both check valves comprise a unitary assembly, all mounted upon the pressure cap 32, it is possible to mount the valve assembly at the top of the reservoir 24 of the radiator 11 in place of the fill cap 12, merely by making a slight change at the bottom of the valve assembly to accommodate a properly located overflow line 37. It is significant to have the open end 40 of the overflow line 37 always located near the highest level of the reservoir in any event, so that the reservoir will always be kept as full as possible.

Further still, by making the valve body 18 of transparent or translucent plastic material it can readily be determined whether or not the radiator is sufficiently full without having to remove the fill cap 12.

Figure 7:
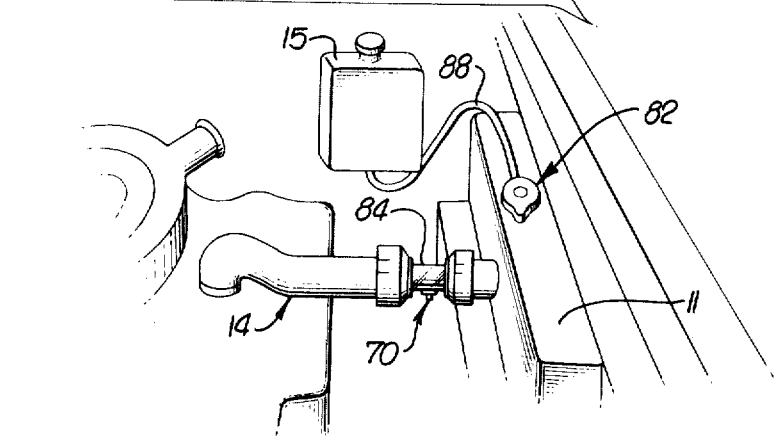
FIGURE 7 is a perspective view of a typical internal combustion engine and cooling system showing the invention installed thereon.
Figure 8:
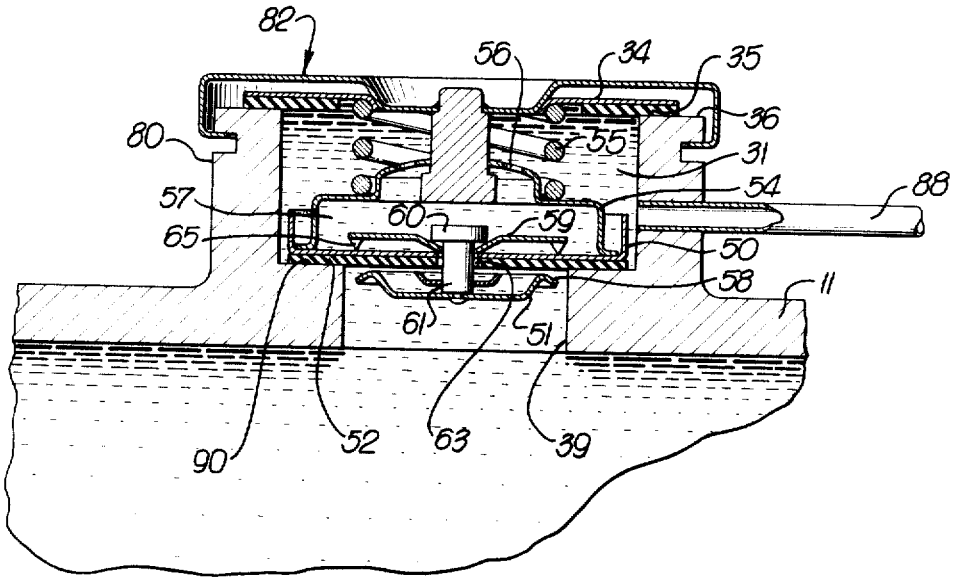
FIGURE 8 is a longitudinal sectional view of the radiator fill neck with the valved radiator cap in operative position thereon showing the position of the valve parts when the radiator is cool and cooling liquid is being fed back into the radiator.

In the embodiment illustrated in FIGURES 7 and 8 a valved radiator cap 82 is provided on radiator filler neck 80 in place of the conventional radiator cap 12, illustrated in FIGURE 1. The valved radiator cap 82 is provided with the same valving illustrated in FIGURES 3 and 4 for pressure cap 32. A transparent circumferential section of coolant return pipe is provided by sight tube 84.

Sight tube 84 is positioned at an upper elevation of return pipe 14. The transparency of sight tube 84 permits observation of the fluid in the return pipe 14. An inflow check valve 70 is provided in sight tube 84 to permit the pressurization of the sealed coolant system by the injection of extra cooling fluid. By means of inflow check valve 70, water or other coolant liquid can be injected into the sealed system without releasing the pressure from the system. The completeness of the filling may be observed visually in the sight tube 84 as the liquid is injected through inflow check valve 70. An overflow pipe 88 is provided as a conduit between the radiator fill neck and the bottom of accumulator tank 15. Overflow pipe 88 extends between the uppermost part of the reservoir in radiator 11 and the lower part of accumulator tank 15. Valve 50 of valve radiator cap 82 seats on valve seat 90.

In operation the embodiment of FIGURES 7 and 8 is installed in the conventional liquid-cooled internal combustion engine by cutting a section out of the return radiator hose and inserting sight tube 84 in the return conduit. The conventional radiator overflow tube is removed, and overflow pipe 88 is substituted therefor. Accumulator tank 15 is mounted at as high an elevation as possible in the engine compartment. Placing the inlet to overflow pipe 88 at the highest point in the system insures that the system will be purged completely of air when it is full of water. It is possible to purge the system of air by filling it to capacity with cooling fluid and then tightening valved radiator cap 82 onto radiator fill neck 80 so as to seal the system. Additional cooling fluid is then injected through inflow check valve 70 until outflow check valve 50 is opened by the pressure of the fluid in radiator 11. The fluid rising through radiator fill neck 80 will displace the air, which will be forced out through overflow pipe 88 and into accumulator 15 where it bubbles to the top and escapes to the atmosphere through a vent in the top of accumulator tank 15. When all of the air has been expelled from the system, liquid will flow into accumulator tank 15, and a rise in the liquid level will be noted. When the liquid level starts to rise in accumulator tank 15, the operator knows that the system has been purged of air. It has been found that the cooling efficiency of the system is enhanced considerably by purging the system completely of air and pressurizing it to a pressure of several pounds per square inch gauge. The heat transfer between the heated internal parts in the engine and the liquid coolant is considerably better when there is no air present in the coolant. The circulating pump, not shown, operates more efficiently when there is no air present to cause cavitation problems. The presence of air in the system also causes a great deal of corrosion to metal parts and deterioration to organic components. The pressurization of the liquid in the system raises the boiling point uniformly throughout the system so that hot spots in the engine do not result in localized boiling. The use of the inflow check valve 70 permits the system to be immediately repressurized or brought back to optimum operating pressure at any location where a source of pressurized cooling liquid, such as water, is available. It may be necessary to pressurize and purge the system in the event the coolant is lost by boiling or leakage. It is also possible to re-establish the desired fluid pressure as a regular, routine maintenance procedure whenever the engine is serviced.

The presence of any air in the pressurized system is readily detected by observing the presence of bubbles in the sight tube 84, particularly when the engine is running. The presence of any air in the system seems to result in an aeration of the water which appears as bubbles throughout the system. When the coolant is not circulating, the presence of air may be detected by observing a void at the top of sight tube 48 because the sight tube is positioned at a high point in the system.

The short valve stem of inflow check valve 70 serves to receive substantially airless cooling liquid and supply it, still unaerated, to the exterior side of the check valve. This provides a means for replenishing the cooling fluid in the cooling system without either relieving the pressure from the system or introducing air into the system.

While the invention has herein been shown and described in what is conceived to be a practical and effective embodiment, it is recognized that departures may be made therefrom within the scope of the invention, which is not to be limited to the details disclosed herein but is to be accorded the full scope of the claims so as to embrace any and all equivalent devices.

Having described the invention, what is claimed as new in support of Letters Patent is:

1. A combustion engine cooling system comprising:

(*a*) *a quantity of liquid coolant for substantially filling said cooling system;*

(*b*) *a combustion engine including:*

(1) *an engine inlet for receiving a flow of said coolant;*

(2) *an engine outlet for discharging the flow of said coolant; and*

(3) *means intermediate said engine inlet and said engine outlet for conveying the flow of said coolant through said engine from said engine inlet to said engine outlet;*

(c) a radiator including:

(1) an outlet for conveying coolant [through a first conduit] to the combustion engine;

(2) an inlet for receiving coolant [through a second conduit] from the combustion engine;

(d) *a first conduit for placing said engine outlet in fluid communication with the inlet to said radiator;*

(e) *a second conduit for placing said engine inlet in fluid communication with the outlet from said radiator;*

(*f*) an opening disposed at a high point in [the] *said cooling* system and adapted to receive a pressure cap;

(*g*) a pressure cap for said opening, said pressure cap including *mean sfor sealing said opening to the ambient atmosphere and further including* first and second pressure loaded check valves, (1) said first check valve adapted to permit fluid flow through said opening in a first direction when its threshold pressure is exceeded;

(2) said second check valve adapted to permit fluid flow through said opening in a second direction opposite said first direction when its threshold pressure is exceeded;

(*h*) an accumulator, said accumulator being provided with:

(*1*) a vent to ambient atmospheric pressure;

(*2*) *an aperture through which quantities of makeup liquid coolant may be readily introduced into said accumulator while said opening remains sealed by said pressure cap; and*

(*3*) *a quantity of makeup liquid coolant sufficient to maintain a minimum coolant level in said accumulator*; and (*i*) a third conduit providing fluid communication between a low point in said accumulator and said opening, *said low point being below said minimum coolant level*, said third conduit co-operating with said pressure cap to conduct fluid in said first direction when said first check valve is open and to conduct fluid in said second direction when said second check valve is open.

2. The cooling system of claim 1 in which said opening is disposed at a high point in said radiator.

3. The cooling system of claim 1 in which said first conduit includes a transparent section for [observing coolant flow from the combustion engine to said radiator] *allowing the observation of said coolant.*

4. The cooling system of claim 1 which further includes an inflow liquid fill fitting comprising a passageway communicating between the exterior and the interior of the system and a check valve disposed in said passageway opening toward the interior of the system such that coolant under pressure exceeding the pressure difference between the exterior and the interior of the system may be introduced through said inflow liquid fill fitting into the system interior.

5. The cooling system of claim 4 in which said inflow liquid fill fitting is integral with a transparent section of said first conduit.

*6. The combination of claim 1 wherein said accumulator further includes closure means for covering said aperture except during the introduction of makeup liquid coolant into said accumulator.*

*7. A sealed cooling system for more effectively transferring heat from an internal combustion engine to the ambient atmosphere while inhibiting corrosion and deterioration of the coolant, the engine components, and the cooling system components, comprising in combination:*

*(a) a quantity of coolant for substantially filling said cooling system;*

*(b) an internal combustion engine which is intermittently operated and thereby heated from ambient temperature to an elevated operating temperature and subsequently cooled toward ambient temperature, said engine including:*

*(1) an engine inlet for receiving a flow of said coolant;*

*(2) an engine outlet for discharging the flow of said coolant; and*

*(3) means intermediate said engine inlet and said engine outlet for conveying the flow of said coolant through said engine from said engine inlet to said engine outlet;*

*(c) a radiator including:*

*(1) a radiator inlet for receiving a flow of said coolant; and*

*(2) a radiator outlet for discharging the flow of said coolant;*

*(d) a first conduit for placing said engine outlet in fluid communication with said radiator inlet;*

*(e) a second conduit for placing said engine outlet in fluid communication with said radiator outlet;*

*(f) an opening disposed at a high point in the cooling system and adapted to receive a pressure cap;*

*(g) an accumulator including:*

*(1) a vent to ambient atmospheric pressure;*

*(2) an aperture through which quantities of makeup liquid coolant may be readily introduced into said accumulator while said cooling system remains sealed; and*

*(3) a quantity of makeup liquid coolant sufficient to maintain a minimum coolant level above a low point in said accumulator;*

*(h) a pressure cap for said opening, said pressure cap providing controlled fluid isolation between said cooling system and said accumulator, said pressure cap including:*

*(1) means for sealing said opening to the ambient atmosphere;*

*(2) a first check valve adapted to permit fluid flow through said opening in a first direction when its threshold pressure is exceeded; and*

*(3) a second check valve adapted to permit fluid flow through said opening in a second direction when its threshold pressure is exceeded; and*

*(i) a third conduit providing fluid communication between said opening and said low point in said accumulator, said third conduit co-operating with said pressure cap to conduct fluid in said first direction when said first check valve is open and to conduct coolant in said second direction when said second check valve is open;*

*whereby the coolant in said sealed cooling system is maintained in a substantially non-compressible liquid state by purging substantially compressible gaseous matter from said cooling system via said accumulator to the ambient atmosphere as said engine heats toward said elevated temperature and by thereafter replacing said gaseous matter with a corresponding quantity of makeup liquid coolant from said accumulator as said engine cools toward ambient temperature.*

*8. The combination of claim 7 wherein said accumulator further includes closure means for covering said aperture except during the introduction of makeup liquid coolant into said accumulator.*

*9. The combination of claim 7 wherein said first conduit includes a transparent section for allowing the observation of said coolant in said cooling system and for allowing the detection of any of said gaseous matter in said cooling system.*

*10. A sealed cooling system for more effectively transferring heat from an internal combustion engine to the ambient atmosphere while inhibiting corrosion and deterioration of the coolant, the engine components, and the cooling system components, comprising in combination:*

*(a) a quantity of liquid coolant for substantially filling said cooling system;*

*(b) an internal combustion engine which is intermittently operated and thereby heated from ambient temperature to an elevated operating temperature and subsequently cooled toward ambient temperature, said engine including:*

*(1) an engine inlet for receiving a flow of said coolant;*

*(2) an engine outlet for discharging the flow of coolant; and*

*(3) means intermediate said engine inlet and said engine outlet for conveying the flow of said coolant through said engine from said engine inlet to said engine outlet;*

*(c) a radiator including:*

*(1) a radiator inlet for receiving a flow of said coolant; and*

*(2) a radiator outlet for discharging the flow of said coolant;*

*(d) a first conduit for placing said engine outlet in fluid communication with said radiator inlet;*

*(e) a second conduit for placing said engine inlet in fluid communication with said radiator outlet;*

*(f) an accumulator including:*

*(1) a vent to ambient atmospheric pressure;*

*(2) an aperture through which quantities of makeup liquid coolant may be readily introduced into said accumulator while said cooling system remains sealed; and*

*(3) a quantity of makeup liquid coolant sufficient to maintain a minimum coolant level above a low point in said accumulator;*

*(g) valving means for providing controlled fluid isolation between said cooling system and said accumulator, said valving means including:*

*(1) an overflow port in fluid communication with a high point in said cooling system;*

*(2) a return port in fluid communication with said low point in said accumulator;*

*(3) a first pressure loaded check valve disposed between said overflow port and said return port and adapted to permit fluid flow from said high point in said cooling system to said low point in said accumulator when the threshold pressure of said first check valve is exceeded; and*

*(4) a second pressure loaded check valve disposed between said overflow port and said return port and adapted to permit fluid flow from said low point in said accumulator to said high point in said cooling system when the threshold pressure of said second check valve is exceeded; and*

*(h) an inflow liquid fill fitting through which said coolant may be introduced into said cooling system, said inflow liquid fill fitting comprising a controllably sealed passageway communicating between the interior and the exterior of said cooling system*

*whereby the coolant in said sealed cooling system is maintained in a substantially non-compressible liquid state by purging substantially compressible gaseous matter from said cooling system via said accumulator to the ambient asmosphere as said engine heats toward said elevated temperature and by thereafter replacing said gaseous matter with a corresponding quantity of makeup liquid coolant from said accumulator as said engine cools toward ambient temperature.*

*11. The combination of claim 10 wherein a third conduit provides said fluid communication between the return port of said valving means and said low point in said accumulator.*

*12. The combination of claim 11 wherein a fourth conduit provides said fluid communication between the overflow port of said valving means and said high point in said cooling system.*

*13. The combination of claim 12 wherein said fourth conduit cooperates with the wall of said first conduit to provide fluid communication through said wall of said first conduit.*

*14. The combination of claim 13 wherein said valving means is secured to a valving section of said first conduit.*

*15. The combination of claim 14 wherein a portion of said valving section is transparent for allowing the observation of said coolant in said cooling system and for allowing the detection of any said gaseous matter in said cooling system.*

*16. The combination of claim 10 wherein said first conduit includes a transparent section for allowing the observation of said coolant in said cooling system and for allowing the detection of any said gaseous matter in said cooling system.*

*17. The combination of claim 10 wherein said accumulator further includes closure means for covering said aperture except during the introduction of makeup liquid coolant into said accumulator.*

*18. The combination of claim 10 wherein said inflow liquid fill fitting further includes a check valve disposed in said passageway, said check valve opening toward the interior of said cooling system, whereby coolant under pressure exceeding the pressure difference between the exterior and the interior of said cooling system may be introduced through said inflow liquid fill fitting into the interior of said cooling system.*

References Cited

The following references, cited by the Examiner, are of record in the patented file of this patent or the original patent.

UNITED STATES PATENTS

| | | | |
|---|---|---|---|
| 2,878,794 | 3/1959 | Stromberg | 123—41.27 |
| 3,096,748 | 7/1963 | Harry | 123—41.15 |
| 3,265,048 | 8/1966 | Herbon | 123—41.15 X |
| 2,086,441 | 7/1937 | Rushmore | 123—41.27 X |

FOREIGN PATENTS

| | | | |
|---|---|---|---|
| 896,850 | 5/1962 | Great Britain | 123—41.54 |
| 989,334 | 4/1965 | Great Britain | 123—41.54 |

ALBERT W. DAVIS, Jr., Primary Examiner

U.S. Cl. X.R.

123—41.15, 41.27, 41.54; 165—51, 107, 138